United States Patent
Candelore et al.

(10) Patent No.: US 7,350,082 B2
(45) Date of Patent: Mar. 25, 2008

(54) UPGRADING OF ENCRYPTION

(75) Inventors: Brant L. Candelore, Escondido, CA (US); Henry Derovanessian, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 708 days.

(21) Appl. No.: 10/293,761

(22) Filed: Nov. 13, 2002

(65) Prior Publication Data

US 2004/0049688 A1 Mar. 11, 2004
US 2007/0271470 A9 Nov. 22, 2007

Related U.S. Application Data

(63) Continuation-in-part of application No. 10/037,914, filed on Jan. 2, 2002, now Pat. No. 7,124,303.

(60) Provisional application No. 60/409,675, filed on Sep. 9, 2002, provisional application No. 60/296,673, filed on Jun. 6, 2001, provisional application No. 60/304,241, filed on Jul. 10, 2001, provisional application No. 60/304,131, filed on Jul. 10, 2001.

(51) Int. Cl.
*G06F 11/30* (2006.01)
*G06F 12/14* (2006.01)
*H04L 9/32* (2006.01)

(52) U.S. Cl. .................. 713/191; 380/28; 380/210; 380/200; 713/163

(58) Field of Classification Search .............. 713/191, 713/163; 380/200, 210, 28
See application file for complete search history.

(56) References Cited

U.S. PATENT DOCUMENTS

| 3,852,519 A | 12/1974 | Court |
| 4,381,519 A | 4/1983 | Wilkinson et al. |
| 4,419,693 A | 12/1983 | Wilkinson |

(Continued)

FOREIGN PATENT DOCUMENTS

EP 0471373 2/1992

(Continued)

OTHER PUBLICATIONS

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

(Continued)

*Primary Examiner*—Nasser Moazzami
*Assistant Examiner*—Fikremariam Yalew
(74) *Attorney, Agent, or Firm*—Miller Patent Services; Jerry A. Miller

(57) ABSTRACT

A method of upgrading an encryption process for encryption of video information from an old encryption process to a new encryption process, consistent with certain embodiments involves selecting a portion of video content for selective encryption. The selected portion is duplicated to produce first and second copies of the selected portion. The first copy is encrypted using the old encryption process and the second copy is encrypted using the new encryption process to produce a dual partially encrypted segment of video information that can either be broadcast over a cable or satellite system or stored in a package medium as two program chains.

33 Claims, 3 Drawing Sheets

U.S. PATENT DOCUMENTS

| | | |
|---|---|---|
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,938 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A | 6/1999 | Chen et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |

| | | | |
|---|---|---|---|
| 6,021,199 A | 2/2000 | Ishibashi | |
| 6,021,201 A | 2/2000 | Bakhle et al. | |
| 6,026,164 A | 2/2000 | Sakamoto et al. | |
| 6,028,932 A | 2/2000 | Park | |
| 6,049,613 A | 4/2000 | Jakobsson | |
| 6,055,314 A | 4/2000 | Spies et al. | |
| 6,055,315 A | 4/2000 | Doyle et al. | |
| 6,057,872 A | 5/2000 | Candelore | |
| 6,058,186 A | 5/2000 | Enari | |
| 6,058,192 A | 5/2000 | Guralnick et al. | |
| 6,061,451 A | 5/2000 | Muratani et al. | |
| 6,064,748 A | 5/2000 | Hogan | |
| 6,065,050 A | 5/2000 | DeMoney | |
| 6,069,647 A | 5/2000 | Sullivan et al. | |
| 6,070,245 A | 5/2000 | Murphy, Jr. et al. | |
| 6,072,872 A | 6/2000 | Chang et al. | |
| 6,072,873 A | 6/2000 | Bewick | |
| 6,073,122 A | 6/2000 | Wool | |
| 6,088,450 A | 7/2000 | Davis et al. | |
| 6,105,134 A | 8/2000 | Pinder et al. | |
| 6,108,422 A | 8/2000 | Newby et al. | |
| 6,115,821 A | 9/2000 | Newby et al. | |
| 6,118,873 A | 9/2000 | Lotspiech et al. | |
| 6,134,237 A | 10/2000 | Brailean et al. | |
| 6,134,551 A | 10/2000 | Aucsmith | |
| 6,138,237 A | 10/2000 | Ruben et al. | |
| 6,148,082 A | 11/2000 | Slattery et al. | |
| 6,154,206 A | 11/2000 | Ludtke | |
| 6,157,719 A | 12/2000 | Wasilewski et al. | |
| 6,181,334 B1 | 1/2001 | Freeman et al. | |
| 6,185,369 B1 | 2/2001 | Ko et al. | |
| 6,185,546 B1 | 2/2001 | Davis | |
| 6,189,096 B1 | 2/2001 | Haverty | |
| 6,192,131 B1 | 2/2001 | Geer et al. | |
| 6,199,053 B1 | 3/2001 | Herbert et al. | |
| 6,204,843 B1 | 3/2001 | Freeman et al. | |
| 6,209,098 B1 | 3/2001 | Davis | |
| 6,215,484 B1 | 4/2001 | Freeman et al. | |
| 6,222,924 B1 | 4/2001 | Salomaki | |
| 6,223,290 B1 | 4/2001 | Larsen et al. | |
| 6,226,618 B1 | 5/2001 | Downs | |
| 6,229,895 B1 | 5/2001 | Son et al. | |
| 6,230,194 B1 | 5/2001 | Frailong et al. | |
| 6,230,266 B1 | 5/2001 | Perlman et al. | |
| 6,236,727 B1 * | 5/2001 | Ciacelli et al. | 380/212 |
| 6,240,553 B1 | 5/2001 | Son et al. | |
| 6,246,720 B1 | 6/2001 | Kutner et al. | |
| 6,256,747 B1 | 7/2001 | Inohara et al. | |
| 6,263,506 B1 | 7/2001 | Ezaki et al. | |
| 6,266,416 B1 | 7/2001 | Sigbjornsen et al. | |
| 6,266,480 B1 | 7/2001 | Ezaki et al. | |
| 6,272,538 B1 | 8/2001 | Holden et al. | |
| 6,278,783 B1 | 8/2001 | Kocher et al. | |
| 6,289,455 B1 | 9/2001 | Kocher et al. | |
| 6,292,568 B1 | 9/2001 | Atkins, III et al. | |
| 6,292,892 B1 | 9/2001 | Davis | |
| 6,307,939 B1 | 10/2001 | Vigarie | |
| 6,311,012 B1 | 10/2001 | Cho et al. | |
| 6,324,288 B1 | 11/2001 | Hoffman | |
| 6,351,538 B1 | 2/2002 | Uz | |
| 6,351,813 B1 | 2/2002 | Mooney et al. | |
| 6,377,589 B1 * | 4/2002 | Knight et al. | 370/524 |
| 6,378,130 B1 | 4/2002 | Adams | |
| 6,389,533 B1 | 5/2002 | Davis et al. | |
| 6,389,537 B1 | 5/2002 | Davis et al. | |
| 6,415,031 B1 | 7/2002 | Colligan et al. | |
| 6,415,101 B1 | 7/2002 | deCarmo et al. | |
| 6,418,169 B1 | 7/2002 | Datari | |
| 6,424,717 B1 | 7/2002 | Pinder et al. | |
| 6,430,361 B2 | 8/2002 | Lee | |
| 6,445,738 B1 | 9/2002 | Zdepski et al. | |
| 6,449,718 B1 | 9/2002 | Rucklidge et al. | |
| 6,452,923 B1 | 9/2002 | Gersberg et al. | |
| 6,453,115 B1 | 9/2002 | Boyle | |
| 6,456,985 B1 | 9/2002 | Ohtsuka | |
| 6,459,427 B1 | 10/2002 | Mao et al. | |
| 6,463,152 B1 | 10/2002 | Takahashi | |
| 6,466,671 B1 | 10/2002 | Maillard et al. | |
| 6,505,032 B1 | 1/2003 | McCorkle et al. | |
| 6,505,299 B1 | 1/2003 | Zeng et al. | |
| 6,510,554 B1 | 1/2003 | Gorden et al. | |
| 6,519,693 B1 | 2/2003 | Debey | |
| 6,526,144 B2 | 2/2003 | Markandey et al. | |
| 6,529,526 B1 | 3/2003 | Schneidewend | |
| 6,543,053 B1 | 4/2003 | Li et al. | |
| 6,549,229 B1 | 4/2003 | Kirby et al. | |
| 6,550,008 B1 | 4/2003 | Zhang et al. | |
| 6,557,031 B1 | 4/2003 | Mimura et al. | |
| 6,587,561 B1 | 7/2003 | Sered et al. | |
| 6,590,979 B1 | 7/2003 | Ryan | |
| 6,640,145 B2 | 10/2003 | Hoffberg et al. | |
| 6,640,305 B2 | 10/2003 | Kocher et al. | |
| 6,650,754 B2 | 11/2003 | Akiyama et al. | |
| 6,654,389 B1 | 11/2003 | Brunheroto et al. | |
| 6,678,740 B1 | 1/2004 | Rakib et al. | |
| 6,681,326 B2 | 1/2004 | Son et al. | |
| 6,684,250 B2 | 1/2004 | Anderson et al. | |
| 6,697,489 B1 | 2/2004 | Candelore | |
| 6,697,944 B1 | 2/2004 | Jones et al. | |
| 6,707,696 B1 | 3/2004 | Turner et al. | |
| 6,714,650 B1 | 3/2004 | Maillard et al. | |
| 6,754,276 B1 | 6/2004 | Harumoto et al. | |
| 6,772,340 B1 | 8/2004 | Peinado et al. | |
| 6,788,690 B2 | 9/2004 | Harri | |
| 6,788,882 B1 | 9/2004 | Geer et al. | |
| 6,826,185 B1 | 11/2004 | Montanaro et al. | |
| 6,883,050 B1 | 4/2005 | Safadi | |
| 6,891,565 B1 | 5/2005 | Dietrich | |
| 6,895,128 B2 | 5/2005 | Bohnenkamp | |
| 6,904,520 B1 | 6/2005 | Rosset et al. | |
| 6,917,684 B1 | 7/2005 | Tatebayashi et al. | |
| 6,936,152 B2 | 8/2005 | Nagai et al. | |
| 6,938,162 B1 | 8/2005 | Nagai et al. | |
| 6,976,166 B2 | 12/2005 | Herley et al. | |
| 7,039,802 B1 | 5/2006 | Eskicioglu et al. | |
| 7,039,938 B2 | 5/2006 | Candelore | |
| 7,065,213 B2 | 6/2006 | Pinder | |
| 7,096,481 B1 | 8/2006 | Forecast et al. | |
| 7,120,250 B2 | 10/2006 | Candelore | |
| 7,124,303 B2 | 10/2006 | Candelore | |
| 7,127,619 B2 | 10/2006 | Unger et al. | |
| 7,139,396 B2 | 11/2006 | Candelore et al. | |
| 7,139,398 B2 | 11/2006 | Candelore et al. | |
| 7,146,007 B1 | 12/2006 | Maruo et al. | |
| 7,151,831 B2 | 12/2006 | Candelore et al. | |
| 7,151,833 B2 | 12/2006 | Candelore et al. | |
| 7,155,012 B2 | 12/2006 | Candelore et al. | |
| 2001/0030959 A1 | 10/2001 | Ozawa et al. | |
| 2001/0036271 A1 | 11/2001 | Javed | |
| 2001/0051000 A1 | 12/2001 | Teshima | |
| 2001/0051007 A1 | 12/2001 | Teshima | |
| 2002/0003881 A1 | 1/2002 | Reitmeier et al. | |
| 2002/0021805 A1 | 2/2002 | Schumann et al. | |
| 2002/0026587 A1 | 2/2002 | Talstra et al. | |
| 2002/0046406 A1 | 4/2002 | Chelehmal et al. | |
| 2002/0047915 A1 | 4/2002 | Misu | |
| 2002/0059425 A1 | 5/2002 | Belfiore et al. | |
| 2002/0066101 A1 | 5/2002 | Gordon et al. | |
| 2002/0083317 A1 | 6/2002 | Ohta et al. | |
| 2002/0083438 A1 | 6/2002 | So et al. | |
| 2002/0097322 A1 | 7/2002 | Monroe et al. | |
| 2002/0108035 A1 | 8/2002 | Herley et al. | |
| 2002/0116705 A1 | 8/2002 | Perlman et al. | |
| 2002/0126890 A1 | 9/2002 | Katayama et al. | |
| 2002/0129243 A1 | 9/2002 | Nanjundiah | |
| 2002/0144260 A1 | 10/2002 | Devara | |

| Publication No. | Date | Inventor |
|---|---|---|
| 2002/0150239 A1* | 10/2002 | Carny et al. .................. 380/37 |
| 2002/0157115 A1 | 10/2002 | Lu |
| 2002/0157116 A1 | 10/2002 | Lu |
| 2002/0164022 A1 | 11/2002 | Strasser et al. |
| 2002/0170053 A1 | 11/2002 | Peterka et al. |
| 2002/0184508 A1 | 12/2002 | Perlman |
| 2002/0194613 A1 | 12/2002 | Unger |
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0026523 A1 | 2/2003 | Unger et al. |
| 2003/0028879 A1 | 2/2003 | Gordon et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1 | 8/2004 | Candelore |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0267602 A1 | 12/2004 | Gaydos et al. |
| 2005/0004875 A1 | 1/2005 | Kontio et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0192904 A1 | 9/2005 | Candelore |
| 2005/0198586 A1 | 9/2005 | Sekiguchi et al. |
| 2005/0259813 A1 | 11/2005 | Wasilewski et al. |
| 2005/0265470 A1 | 12/2005 | Strasser et al. |
| 2005/0265547 A1 | 12/2005 | Strasser et al. |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |
| 2006/0262926 A1 | 11/2006 | Candelore et al. |
| 2006/0269060 A1 | 11/2006 | Candelore et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |
| WO | WO 01/78386 A2 | 10/2001 |

OTHER PUBLICATIONS

Kunkelmann T. et al., A scalable security architecture for multimedia communication standards, Darmstadt Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17, 1997, submitted to International Conference on Image Science, Systems, and Technology, CISST'97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Multimedia and Security Workshop at ACM Multimedia" '98. Bristol, U.K., Sep. 1998.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98. Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, Apr. 30, 2000, Course Notes, Department of Computer Science and Engineering, Indian Institute of Technology Kanpur.

"Fast Encryption Methods for Audiovisual Data Confidentiality" by Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of The New York Times, Updated Thursday, Dec. 20, 2001.

"Pre-Encryption Profiles—Concept Overview and Proposal", Rev. 1.2 as submitted to the Open CAS consortium on Dec. 28, 2000.

"Dynamic-Customized TV Advertising Creation and Production Tools" by SeaChange International, Web Site Literature.

Anonymous, Message Authentication with Partial Encryption, Research disclosure RD 296086, Dec. 10, 1988.

Anonymous, New Digital Copy Protection Proposal Would Secure Authorized Copies, PR Newswire, Nov. 1998, pp. 1-3.

"A Report on Security Issues in Multimedia" by Gulwani, pp. 10-14, Apr. 30, 2000, Course Notes, Department of Computer Science and Engineering, Indian Institute of Technology Kanpur.

"Coral Consortium Aims to Make DRM Interoperable", by Bill Rosenblatt, Oct. 7, 2004, online at http://www.drmwatch.com/standards/article.php/3418741.

Metro Media™ PVR-DVD-MP3-Web—Internet publication from www.metrolink.com, undated.

"The Long March to Interoperable Digital Rights Management" by Koenen et al., pp. 1-17, 2004, IEEE.

Aravind, H., et al., "Image and Video Coding Standards", AT&T Technical Journal, (Jan./Feb. 1993), 67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1997),29-44.

Park, et al., "A Simple Concealment for ATM Bursty Cell Loss", IEEE Transactions on Consumer Electronics, No. 3, (Aug. 1993), 704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

"How Networks Work—Milennium Edition"—pp. 88-89, Que Corporation, 2000.

Microsoft Windows XP, Oct. 2001, Microsoft, Screen Shots and Help Files.

MPEG-2 Digital Broadcast Pocket Guide vol. 6, Copyright 201 Acterna, LLC.

U.S. Appl. No. 10/634,546, filed Oct. 2001, Microsoft Screen Shots and Help Fites Microsoft Windows XP.

U.S. Appl. No. 10/667,614, filed 2001, MPEG-2 Digital Broadcast Pocket Guide vol. 6, Acterna, LLC.

\* cited by examiner

UPGRADING OF ENCRYPTION

CROSS REFERENCE TO RELATED DOCUMENTS

This application claims priority to U.S. Provisional Application No. 60/409,675, filed Sep. 9, 2002 which is hereby incorporated by reference, and is a continuation-in-part of U.S. patent application Ser. No. 10/037,914, filed Jan. 2, 2002, now U.S. Pat. No. 7,124,303 which claims priority of U.S. Provisional Application Nos. 60/296,673 filed Jun. 6, 2001; 60/304,241, filed Jul. 10, 2001; and 60/304,131, filed Jul. 10, 2001.

This application is related to patent applications entitled "Critical Packet Partial Encryption" to Unger et al., Ser. No. 10/038,217; patent applications entitled "Time Division Partial Encryption" to Candelore et al., Ser. No. 10/038,032; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002. This application is also related to U.S. patent applications Ser. No. 10/273,905, filed Oct. 18, 2002 to Candelore et al. entitled "Video Slice and Active Region Based Dual Partial Encryption", which is hereby incorporated by reference; Ser. No. 10/273,903, filed Oct. 18, 2002 to Candelore et al. entitled "Star Pattern Partial Encryption"; Ser. No. 10/274,084, filed Oct. 18, 2002 to Candelore et al. entitled "Slice Mask and Moat Pattern Partial Encryption", and Ser. No. 10/274,019, filed Oct. 18, 2002 to Candelore et al. entitled "Video Scene Change Detection". These applications are hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of digital video and encryption thereof. More particularly, this invention relates to an encryption method and apparatus particularly useful for encrypting packetized video content such as that provided by cable and satellite television systems.

BACKGROUND OF THE INVENTION

The above-referenced commonly owned patent applications describe inventions relating to various aspects of methods generally referred to herein as partial encryption or selective encryption. More particularly, systems- are described therein wherein selected portions of a particular selection of digital content (e.g., a television program) are encrypted using two (or more) encryption techniques while other portions of the content are left unencrypted. By properly selecting the portions to be encrypted, the content can effectively be encrypted for use under multiple decryption systems without the necessity of encryption of the entire selection of portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes (STBs) or other implementations of conditional access (CA) receivers from multiple manufacturers in a single system—thus freeing the cable or satellite company to competitively shop for providers of Set-top boxes.

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
FIG. 1 illustrates a chain of video object units as used in a Digital Versatile Disc (DVD).

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of AN content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing package medium and broadcast, cable and satellite systems such as existing encryption technology used at the launch of such a system. The exemplary embodiments disclosed in the above applications and consistent with certain embodiments of the present invention are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein. The term "package medium" and similar terms as used herein are intended to embrace a recording medium such as a Digital Versatile Disc (DVD), Compact Disc (CD) or other magnetic, optical or other recorded medium that is generally merchandised as a package that contains the electronic storage medium and is sold as a retail commodity, as contrasted to an electronically downloadable data stream.

In order to provide content control and protection for both broadcast content (whether by satellite, cable, pay-per-view or otherwise) as well as for packaged media such as Digital Versatile Discs (DVDs), various types of encryption are often utilized. Either the entire content is encrypted under a given encryption system using a particular encryption technique, or the content is partially encrypted using a particular encryption technique.

Unfortunately, as computing power grows, a single encryption technique or a given encryption key may be rendered ineffective in thwarting those who would attempt to pirate the protected content. This problem has been recognized in the satellite and cable industry where it is common to make changes to encryption keys on a regular basis. For example, it is common for such systems to change keys on a monthly basis. Moreover, although less frequent, it is occasionally advisable to upgrade the encryption process itself. By way of example, DES (Data Encryption Standard) encryption can be upgraded from 40 bit encryption to 56 bit encryption to 128 bit encryption, etc. to enhance the security of the encryption. Unfortunately, even with these key sizes, with today's desktop computing power, it is feasible to hack an encryption key by brute force. In another example, DES encryption can be upgraded to a more sophisticated encryption algorithm such as Triple DES, Advanced Encryption Standard (AES) or Common Scrambling Algorithm (CSA). When this happens, upgrading of the software within a television STB or equivalent device may require a software download or even a change in hardware.

Similarly, encryption techniques used in packaged media may be subject to being cracked by hackers and thus the security of the content compromised. Such is the case for the encryption algorithm originally released with the introduction of DVDs, which has been cracked and the decryption technique posted on the Internet. While the problem is substantial in the case of a content distributor such as a cable system operator, in the case of package media such as DVDs, the problem may even more complex since any encryption used in the packaged medium should be compatible with playback equipment from any of dozens of vendors (whereas, the cable or satellite system may be a closed environment with only one or a small limited number of approved vendors). Thus, until a generational change in encryption standards for the package medium can be made, the content may be compromised. Moreover, the user's existing content may become obsolete by any radical change in encryption introduced to prevent piracy. This may make it extremely difficult for equipment manufacturers to phase out equipment in favor of new equipment, since such changes might be rejected by the consumer. Thus, a transitional mechanism would be beneficial in order to make a transition to a new encryption standard which preserves the current encryption standard for a while, yet facilitates transition to a new standard.

In the above-referenced patent applications, a technique called dual partial encryption or dual selective encryption is described. In this technique, selective portions of video and/or audio content are encrypted while other portions are transmitted unencrypted (clear). By appropriate selection of the content to be encrypted, a very high level of security of the content can be maintained at the sacrifice of minimal amounts of overhead. Since the amount of encrypted content is a small percentage of the overall program content, that small portion can be duplicated and encrypted under several encryption schemes. This makes it possible to decode the program on multiple decoders using multiple decryption schemes. The various encrypted portions in the above applications are distinguished by use of multiple program identifiers (PIDs). The present invention extends this concept to use in upgrading of encryption techniques for both broadcast content and packaged media.

First consider the example of packaged media, and in particular for purposes of this example (but without limitation) DVDs. DVDs are currently partially encrypted with up to 25% of the overall content being encrypted and up to 50% of any one sector being encrypted. However, the selected VOBU (video object units—a packet definition for packets of 2048 bytes used in DVDs) which are currently encrypted are not necessarily optimally selected. As the above-referenced patent applications have illustrated, by optimal selection of the content to be encrypted, a much lower percentage of packets can be encrypted to still effectively render the content well protected. The selection of content to be encrypted can be any of the selections identified in the above-referenced patent applications, such as, for example without limitation, packets containing a video slice header, packets containing a video slice header appearing in an active region of a video frame, any packet carrying data representing an active region of a video frame, I Frame packets, packets containing motion vectors in a first P frame following an I Frame, packets having an intra_slice_flag indicator set, packets having an intra_slice indicator set, packets containing an intra_coded macroblock, packets that carry data for a slice containing an intra_coded macroblock, packets containing data from a first macroblock following the video slice header, packets containing video slice headers, packets containing anchor data, and P Frame packets for progressively refreshed video data, packets occurring in a star pattern approximately situated at approximately a center of an image, packets carrying data representing a pattern of horizontal stripes across an image, packets carrying data representing a pattern of vertical stripes across an image, packets carrying information that is needed to decode the content, packets carrying a payload that comprises a packetized elementary stream (PES) header, samples of the video content taken at prescribed sampling intervals, packets containing a specified elementary stream, and any other suitable packet selection criterion.

Once a collection of VOBUs (packets) are selected for encryption, the content is dual partial encrypted so that it has a clear portion, a portion encrypted using the old encryption process and a portion encrypted using the new encryption process. The dual partial encrypted video content is then stored on the DVD so that a first program chain references the clear portion and the portion encrypted using the old encryption process, and so that a second program chain references the clear portion and the portion encrypted using the new encryption process. Such alternative program chains are currently used in some DVDs to provide additional program content such as director cuts, different viewing angles, alternate plots and endings, and to provide parental control and alternative audio tracks. The majority of DVDs currently in production have only a single linear program chain.

A dual partially encrypted DVD (or other package medium such as a CD) can thus be used as a transitional medium to facilitate conversion to the new encryption format. Consider, FIGS. 1-4 to understand the principles of the transition to a new encryption algorithm. FIG. 1 depicts a DVD which is partially encrypted using the current standard CSS (Content Scrambling System) encryption system. In this figure, a selection of content contains a sequence of VOBUs (packets) having clear VOBUs 20 and encrypted VOBUs 24. The chain of clear VOBUs 20 and encrypted VOBUs 24 together form a content selection that can be played back through a standard DVD player that understands and decrypts CSS encrypted VOBUs.

Figure 2:
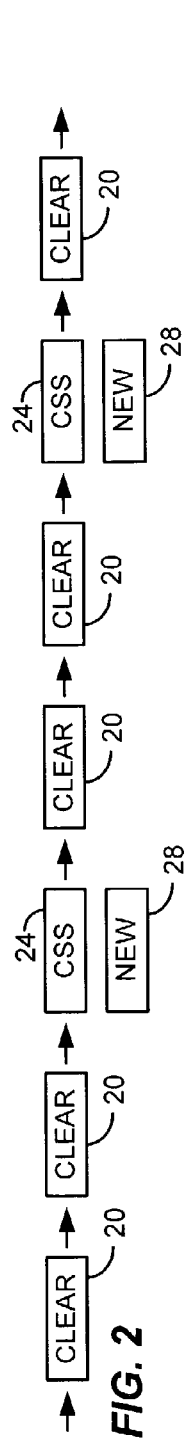
FIG. 2 illustrates a dual partially encrypted DVD with a video chain using standard encryption consistent with certain embodiments of the present invention.
Figure 3:
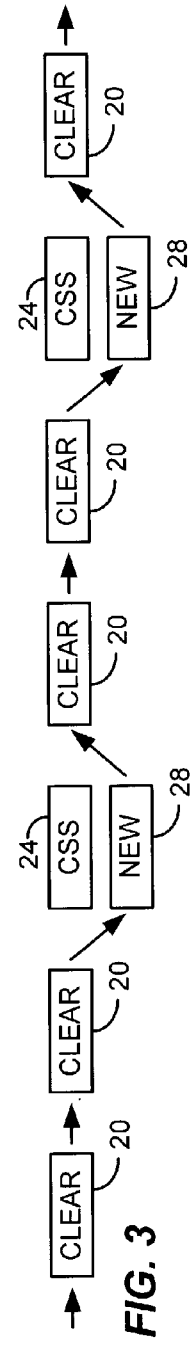
FIG. 3 illustrates a dual partially encrypted DVD with a video chain using a new encryption consistent with certain embodiments of the present invention.

FIGS. 2 and 3 depict a dual partially encrypted DVD consistent with certain embodiments of the present invention. In these figures, the DVD contains the same chain of partially encrypted content made up of VOBUs 20 and 24 as shown in FIG. 1. Thus, a standard DVD player that decrypts CSS encrypted VOBUs can play back the DVD depicted in FIG. 2 by simply following the program chain shown. A new DVD player can be introduced that also can play back the DVD by following the program chain shown in FIG. 3. The new DVD player need not be able to decode CSS encryption as long as it can decode a new encryption scheme (shown as NEW).

In this arrangement of FIG. 3, the new DVD player utilizes a program chain defined at the time of the manufacture of the DVD that bypasses VOBUs 24 in favor of VOBUs 28 that utilize the new encryption system. Such new DVD players could be programmed to only recognize the program chain associated with the new encryption system, yet the same DVD could be backward compatible with CSS encryption as well as being compatible with the new system. The process used to distinguish between the two encryption systems is similar to that used for parental control or separate viewing angles available on some currently available DVDs.

As applied to DVDs certain embodiments of the present invention would select Video Object Unit packets which are important to the decoding of the rest of the content. The Units chosen for encryption would be duplicated and scrambled with CSS and a new improved algorithm. A new type of program chain called "security" can be created that only the new players will understand and respond to. These would be similar to how parental rating program chains are managed. Older players will simply take the program chain containing CSS scrambled packets. New players would take the security program chain with the new algorithm packets.

The use of CSS encrypted packets in one program chain assures that new DVDs work in old DVD players. The duplicated and non-CSS scrambled packets will not interfere with the old players. The duplicated packets using the new encryption algorithm can be encoded as alternate track or program chain (PGC).

Thus, new players can be "forced" to take the program chain with the new encryption algorithm automatically. Like camera angle branches, branches for encryption would be tightly interleaved together. These would likely use Interleaved Blocks (ILVB). So, in the case of the arrangements depicted in FIGS. 2-3, the branches used for multiple encryption as depicted herein, are preferably tightly interleaved and preferably use Interleaved Blocks.

Figure 4:
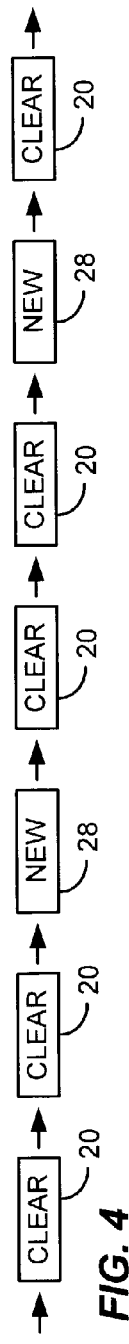
FIG. 4 illustrates a partially encrypted DVD with a video chain using a new encryption consistent with certain embodiments of the present invention.

Once the marketplace has matured somewhat and the new encryption system is standard, DVD manufacturers can begin phasing out dual encrypted DVDs as shown in FIGS. 2-3 in favor of the format depicted in FIG. 4. When the market is mature enough, the new DVDs will only be compatible with new DVD players and only the new encryption system is needed. Alternatively, the new DVDs can be dual partially encrypted with the next generation of encryption technology in the same manner as shown in FIGS. 2-3.

Therefore, in accordance with certain embodiments consistent with the present invention, multiple replacement encryption algorithms can be used to produce packaged media such as DVDs so that each DVD contains multiple partially encrypted content. This will allow new players to actually phase out support for the older encryption algorithms since the older DVDs would already have the new algorithm encoded into them (even prior to marketing new players).

Thus, as described, a method of providing an upgrade for encryption used to encrypt video content stored in a Digital Versatile Disc (DVD) from an old encryption process to a new encryption process, consistent with certain embodiments of the invention, involves selecting a portion of video content for dual partial encryption; dual partial encrypting the video content so that the video content has a clear portion, a portion encrypted using the old encryption process and a portion encrypted using the new encryption process; storing the dual partial encrypted video content on the DVD so that a first program chain references the clear portion and the portion encrypted using the old encryption process, and so that a second program chain references the clear portion and the portion encrypted using the new encryption process.

Similarly, a method of providing an upgrade for encryption used for encryption of video content stored in package medium from an old encryption process to a new encryption process, consistent with certain embodiments of the invention, involves selecting a portion of video content for selective encryption; duplicating the selected portion of content to produce first and second copies of the selected portion; encrypting the first copy of the selected portion using the old encryption process; encrypting the second copy of the selected portion using the new encryption process; storing the portion of the video content which is not selected as clear content on the package medium; storing the encrypted first copy and the encrypted second copy of the selected portion on the package medium.

Figure 5:
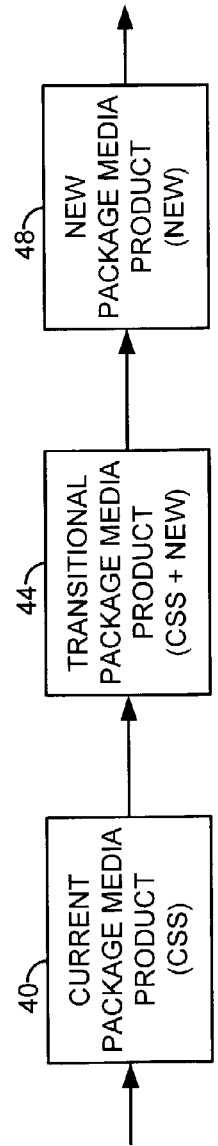
FIG. 5 illustrates a product transition cycle consistent with certain embodiments of the present invention.

Thus, the transition path to a newer and more secure encryption method is depicted in FIG. 5 where initially, at 40, manufacturers of DVDs and DVD players manufacture the players and media using the technique illustrated in FIG. 1 where only a single encryption process is used. During a transitional stage, the package media is dual partially encrypted to carry data encrypted by both the old encryption process and the new process at 44. Finally, at 48, the transition can be completed by phasing out the use of the original encryption process entirely. During the interim, at 44, players may be compatible with either encryption system or both and can still decode and play back the medium.

Consider now the application of dual partial encryption to the broadcast content industry. In the US cable and satellite markets, the Data Encryption Standard (DES) is primarily in use. DES is quickly becoming obsolete. The current standard version of DES as used by the cable and satellite industry generally uses a 56-bit key. With the rapidly increasing processing capabilities of PCs, decoding by a brute force trial of all possible keys with one or more computers, is rapidly becoming more feasible.

One of the most difficult things for a service provider to do is to upgrade the low level scrambling of a content delivery network. This is because of the installed base of decoders that perform decryption only based on the old encryption process and have no provision for upgrading the encryption. It is difficult for an operator to upgrade all the units in the field. This could potentially cost many millions of dollars. One possible solution is the use of Point of Deployment (POD) modules. When they are deployed, POD modules will provide one method of changing the low level scrambling used in a network. This is accomplished by wholesale replacement of all PODs in the network. However, even replacing POD modules can be costly, and this avenue is not available for decoders that do not support PODs. As of this date, PODs have only been deployed in limited numbers in the US cable market. Using current technology, new scrambling cannot be used until all the units or modules doing the old encryption are removed from the field. This is a logistical and financial problem as mentioned earlier. The invention allows new Set-top boxes and other decoding devices to be introduced without the need to make legacy STBs and other decoders obsolete. As an impetus to replace older units, the service operator may withhold new services to these devices, an thus compel the users to get new units (performing the new algorithm) to get the new services.

Figure 6:
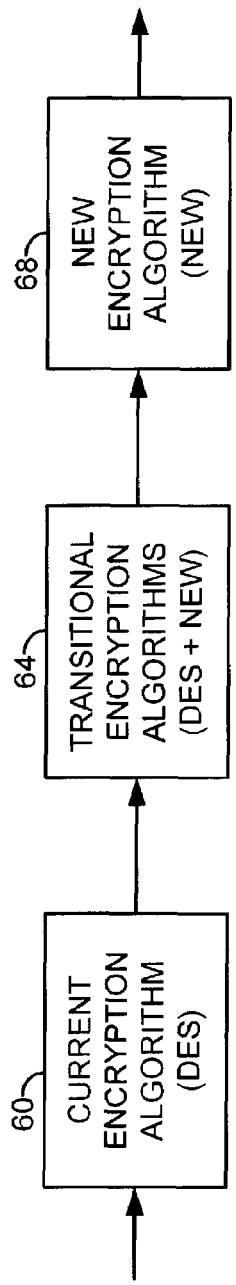
FIG. 6 illustrates a product transition cycle consistent with certain embodiments of the present invention.

Accordingly, the progression for transition to a new encryption algorithm for cable and satellite operators (and similar content providers) is similar to that depicted in FIG. 5 and is illustrated more explicitly in FIG. 6. In this figure, the current encryption algorithm is depicted at 60 with a transitional phase at 64 being used to transition from an old encryption algorithm to a newer algorithm as new STBs or PODs are introduced. When a large installed base of newer STBs is achieved, the new encryption algorithm may be used exclusively at 68.

Thus, in accordance with certain embodiments of the present invention, a method of upgrading an encryption process for encryption of video information from an old encryption process to a new encryption process involves selecting a portion of video content for selective encryption; duplicating the selected portion of content to produce first and second copies of the selected portion; encrypting the first copy of the selected portion using the old encryption process; and encrypting the second copy of the selected portion using the new encryption process.

In order to achieve the desired dual partial encryption according to the present invention for making a transition between two encryption algorithms, a newly deployed decoder (e.g., a STB) is provided with a mechanism to distinguish the encrypted portions of the program material. This is accomplished in the manner described in the above-referenced patent applications. In one preferred method, the dual encrypted packets are distinguished by use of separate Program Identifiers (PIDs). That is, clear packets are identified by a first packet identifier. Dual encrypted packets are identified by a pair of PIDs that distinguish the new encryption system from the old. For example, PID 101 can be associated with clear packets as well as packets encrypted under the old encryption system. PID 102 can be used to identify packets encrypted under the new encryption system and is referred to as a secondary PID or shadow PID. The new STB is provided with the PIDs associated with the program and then decodes the program by ignoring encrypted packets with PID 101 in favor of encrypted packets with PID 102. This process is described in detail in the above-referenced patent applications.

In accordance with certain embodiments consistent with the present invention, a selectively encrypted digital video signal can be embodied in a carrier wave, that has a stream of packets of video data, wherein the stream of packets when not encrypted represent a segment of video content; certain of the packets being unencrypted and certain of the packets being encrypted under a legacy encryption method and certain of the packets being encrypted under a replacement encryption method; a first segment of code that identifies the unencrypted packets by a first packet identifier (PID); and a second segment of code that identifies the encrypted packets by a second packet identifier (PID).

Figure 7:
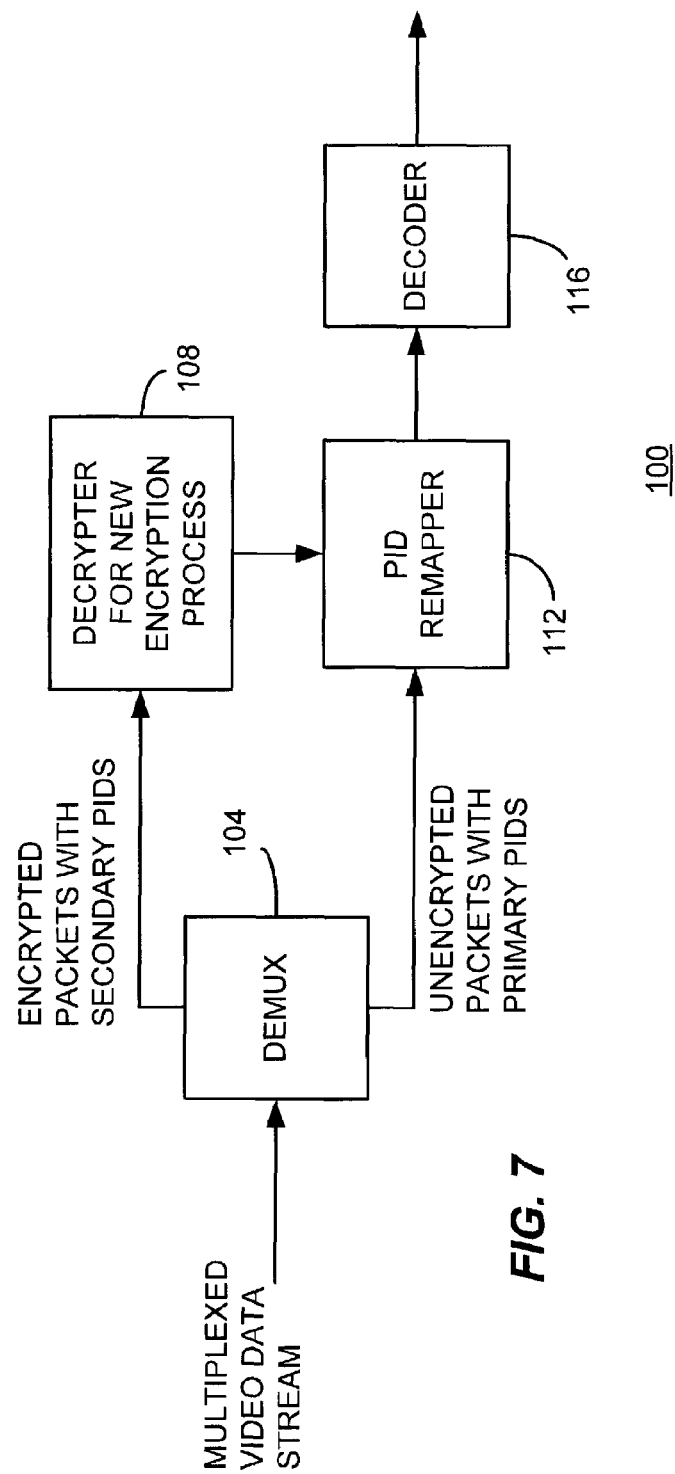
FIG. 7 illustrates a television Set-top box that decrypts and decodes in a manner consistent with certain embodiments of the present invention.

An authorized Set-top box such as 100 illustrated in FIG. 7 operating under the new encryption system decrypts and decodes the incoming program by recognizing both primary and secondary PIDs associated with a single program. The multiplexed video data stream containing both PIDs is directed to a demultiplexer 104. When a program is received that contains encrypted content that was encrypted by any of the selective encryption techniques described in the above-referenced patent applications, the demultiplexer directs encrypted packets containing content encrypted under the new encryption algorithm and secondary PIDS to a decrypter 108 that decrypts the packets encrypted under the new encryption system. After these packets are decrypted at 108, they are passed to a PID remapper 112. As illustrated, the PID remapper 112 receives packets that are unencrypted and bear the primary PID as well as the decrypted packets having the secondary PID. The PID remapper 112 combines the decrypted packets from decrypter 108 with the unencrypted packets having the primary PID to produce an unencrypted data stream representing the desired program. PID remapping is used to change either the primary or secondary PID or both to a single PID. This unencrypted data stream can then be decoded normally by decoder 116. Some or all of the components depicted in FIG. 7 can be implemented as program code running on a programmed processor running code stored on an electronic storage medium.

In one embodiment of the case of package media consistent with the present invention, the decoder or player used to decode the content encrypted under the new encryption algorithm may be functionally identical to a conventional decoder or player except for the substitution of a different decrypter or different decryption algorithm. In other exemplary embodiments, the decoder or player can be designed to recognize newly encrypted program chains while ignoring program chains associated with the old encryption algorithm.

In other embodiments consistent with the present invention, a method of playback of content stored on a recording medium involves reading a portion of the recording medium to determine that the recording medium contains content containing portions encrypted under multiple encryption techniques; selecting content having portions encrypted under one of the multiple encryption techniques; and playing the content, wherein the playing comprises decrypting the encrypted portion of the content.

Figure 8:
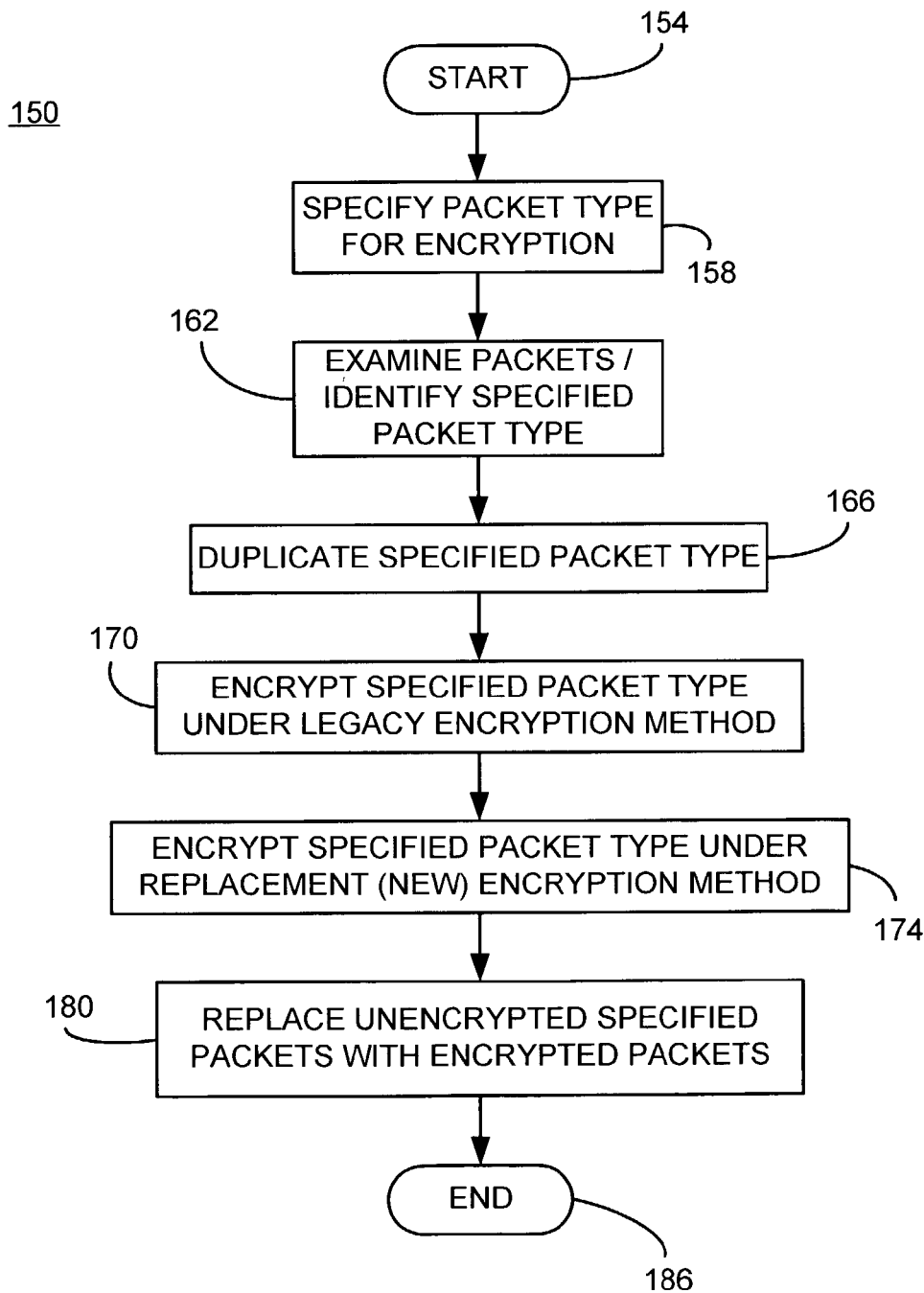
FIG. 8 is a flow chart depicting an encryption process consistent with certain embodiments of the present invention.

FIG. 8 is a flow chart 150 that broadly illustrates the encryption process consistent with certain embodiments of the present invention starting at 154. At 158 the VOBU or other packet type that is to be encrypted is specified. In accordance with certain embodiments consistent with the present invention, the selected packet type may be any of the packets described above that generally contain data that makes it difficult to decode the content. Packets are then examined at 162 to identify packets of the specified type. At 166, the identified packets are duplicated and at 170 one set of these packets is encrypted under a the old "legacy" encryption method. The other set of identified packets is encrypted at 174 under a the new encryption method that is designed to replace the legacy encryption method. The originally identified packets are then replaced in the data with the two sets of encrypted packets at 180 and the process ends at 186. In certain embodiments, other steps are taken such as indexing the two program chains in the package medium, etc.

Thus, a method of upgrading an encryption process for encryption of video information from an old encryption process to a new encryption process, consistent with certain embodiments involves selecting a portion of video content for selective encryption. The selected portion is duplicated to produce first and second copies of the selected portion. The first copy is encrypted using the old encryption process and the second copy is encrypted using the new encryption process to produce a dual partially encrypted segment of video information that can either be broadcast over a cable or satellite system or stored in a package medium, for example, as two program chains.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of providing an upgrade for encryption used to encrypt video content stored in a Digital Versatile Disc (DVD) from an old encryption process to a new upgraded encryption process, comprising:

selecting a portion of video content for dual partial encryption;

dual partial encrypting the video content so that the video content has a clear portion, a portion encrypted using the old encryption process and a portion encrypted using the new upgraded encryption process;

storing the dual partial encrypted video content on the DVD so that a first program chain stored on the DVD references the clear portion and the portion encrypted using the old encryption process, and so that a second program chain stored on the DVD references the clear portion and the portion encrypted using the new upgraded encryption process; and wherein encryption can be upgraded from the old encryption process to the new encryption process without modification to the DVD by decryption of the selected portions of the video content encrypted under the old encryption process using the first encryption chain when using a decryption device compatible with the old encryption process and encryption of the selected portions of the video content encrypted under the new encryption process using the new encryption chain when using a decryption device compatible with the new encryption process.

2. The method according to claim 1, wherein the selected portion comprises a collection of video object units.

3. A DVD storing content processed in accordance with the method of claim 2.

4. The method according to claim 1, wherein the portion encrypted using the old encryption process and the portion encoded using the new upgraded encryption process are stored on the DVD using interleaved blocks.

5. A DVD storing content processed in accordance with the method of claim 4.

6. The method according to claim 1, wherein the old encryption process comprises a process that uses the Content Scrambling System algorithm (CSS).

7. A DVD storing content processed in accordance with the method of claim 6.

8. A DVD storing content processed in accordance with the method of claim 1.

9. A method of providing an upgrade for encryption used for encryption of video content stored in package medium from an old encryption process to a new upgraded encryption process, comprising:

selecting a portion of video content for selective encryption;

duplicating the selected portion of content to produce first and second copies of the selected portion;

encrypting the first copy of the selected portion using the old encryption process;

encrypting the second copy of the selected portion using the new upgraded encryption process;

storing the portion of the video content which is not selected as clear content on the package medium;

storing the encrypted first copy and the encrypted second copy of the selected portion on the package medium;

storing a first program chain that references the clear portion and the portion encrypted using the old encryption process, storing a second program chain that references the clear portion and the portion encrypted using the new upgraded encryption process on the packaged medium; and wherein encryption can be upgraded from the old encryption process to the new encryption process without modification to the package medium by decryption of the selected portions of the video content encrypted under the old encryption process using the first program chain when using a device compatible with the old encryption process, and encryption of the selected portions of the video content encrypted under the new encryption process using the new encryption chain when using a device compatible with the new encryption process.

10. The method according to claim 9, wherein the package medium comprises a DVD.

11. A DVD storing content processed in accordance with the method of claim 10.

12. The method according to claim 9, wherein the old encryption process comprises a process that uses the Content Scrambling System algorithm (CSS).

13. A DVD storing content processed in accordance with the method of claim 9.

14. A method of playback of content stored on a recording medium using a playback device having a decrypter capable of operating using only one of multiple decryption techniques, comprising:

reading a portion of the recording medium to determine that the recording medium contains content containing portions encrypted under multiple encryption techniques;

selecting content having portions encrypted under only the one of the multiple encryption techniques said one of the encryption techniques being the one compatible with said playback device;

playing the content, wherein the playing comprises decrypting the encrypted portion of the content; and wherein encryption can be upgraded from the old encryption process to the new encryption process without modification to the DVD by decryption of the selected portions of the video content encrypted under the old encryption process using the first encryption chain when using a decryption device compatible with the old encryption process and encryption of the selected portions of the video content encrypted under the new encryption process using the new encryption chain when using a decryption device compatible with the new encryption process; and wherein the multiple encryption techniques comprise a legacy encryption technique and an encryption technique to be used as a replacement for the legacy encryption technique; and wherein the selected content has portions encrypted under the legacy encryption technique; and wherein the selecting comprises selecting a program chain containing the portions encrypted under the legacy encryption technique.

15. The method according to claim 14, wherein the selected content has portions encrypted under the replacement for the legacy encryption technique.

16. The method according to claim 15, wherein the selecting comprises selecting a program chain containing the portions encrypted under the replacement for the legacy encryption technique.

17. A method of providing an upgrade for encryption used for encryption of video content for electronic distribution by a content provider from an old encryption process to a new encryption process, comprising:

selecting a portion of video content for dual partial encryption;

dual partial encrypting the video content so that the video content has a clear portion, a portion encrypted using the old encryption process and a portion encrypted using the new encryption process;

transmitting the dual partial encrypted video content over a broadcast medium; and wherein encryption can be upgraded from the old encryption process to the new encryption process by decryption of the selected portions of the video content encrypted under the old encryption process when using a receiver device compatible with the old encryption process and encryption of the selected portions of the video content encrypted under the new encryption process when using an upgraded receiver device compatible with the new encryption process.

18. The method according to claim 17, wherein the broadcast medium comprises one of a cable and a satellite network.

19. The method according to claim 17, further comprising assigning program identifiers (PIDs) to distinguish between the portions encrypted using the old encryption process and the portion encrypted under the new encryption process.

20. The method according to claim 17, wherein the old encryption process comprises a data encryption standard (DES) encryption process.

21. The method according to claim 17, wherein the new encryption process comprises one of Triple DES, Advanced Encryption Standard (AES) and Common Scrambling Algorithm (CSA).

22. A method of decoding a stream of packets containing electronically distributed video content from a content provider, wherein the content is dual partially encrypted using an old encryption process and a new encryption process, the method being carried out at a decoding device compatible with the new encryption process comprising:

receiving the stream of dual partially encrypted video content at the decoding device compatible with the new encryption process;

discarding packets encrypted by the old encryption process;

decrypting packets encrypted by the new encryption process;

combining the decrypted packets with unencrypted packets to create a clear stream of packets for decoding; and wherein encryption can be upgraded from the old encryption process to the new encryption process without modification to the stream of packets by decryption of the selected portions of the video content encrypted under the old encryption process when the decoding device is compatible with the old encryption process and encryption of the selected portions of the video content encrypted under the new encryption process when the decoding device is compatible with the new encryption process.

23. The method according to claim 22, wherein the stream of dual partially encrypted video content is received over one of a cable network and a satellite network.

24. The method according to claim 22, wherein program identifiers (PIDs) are used to distinguish between the portions encrypted using the old encryption process and the portion encrypted under the new encryption process, and wherein the discarding comprises discarding packets identified by the PID associated with the old encryption process.

25. The method according to claim 22, wherein the old encryption process comprises a data encryption standard (DES) encryption process.

26. The method according to claim 22, wherein the new encryption process comprises one of Triple DES, Advanced Encryption Standard (AES) and Common Scrambling Algorithm (CSA).

27. A method of upgrading an encryption process for encryption of video information from an old encryption process to a new upgraded encryption process, comprising:

selecting a portion of video content for selective encryption;

duplicating the selected portion of content to produce first and second copies of the selected portion;

encrypting the first copy of the selected portion using the old encryption process;

encrypting the second copy of the selected portion using the new upgraded encryption process; and wherein the unselected portion and the encrypted first copy are stored as a first program chain and wherein the unselected portion and the encrypted second copy are stored as a second program chain, and wherein said storage is carried out on a packaged medium; and wherein encryption can be upgraded from the old encryption process to the new encryption process without modification to the video information by selection of the first program chain thereby using the selected portions of the video content encrypted under the old encryption process when using a playback device compatible with the old encryption process and using the second program chain and thereby using the selected portions of the video content encrypted under the new encryption process when using a playback device compatible with the new encryption process.

28. The method according to claim 27, further comprising transmitting the encrypted first copy and encrypted second copy along with unselected portions of the video content over one of a cable network and a satellite network.

29. The method according to claim 27, further comprising distinguishing between the portions encrypted using the old encryption process and the portion encrypted under the new encryption process by assigning distinctive program identifiers (PIDs) to each.

30. The method according to claim 27, wherein the old encryption process comprises a data encryption standard (DES) encryption process.

31. The method according to claim 27, wherein the new encryption process comprises one of Triple DES, Advanced Encryption Standard (AES) and Common Scrambling Algorithm (CSA).

32. The method according to claim 27, further comprising storing the encrypted first copy and encrypted second copy along with unselected portions of the video content a digital versatile disc (DVD).

33. The method according to claim 32, wherein the old encryption process comprises a process that uses the Content Scrambling System algorithm (CSS).

* * * * *

UNITED STATES PATENT AND TRADEMARK OFFICE
CERTIFICATE OF CORRECTION

| | | |
|---|---|---|
| PATENT NO. | : 7,350,082 B2 | |
| APPLICATION NO. | : 10/293761 | |
| DATED | : March 25, 2008 | |
| INVENTOR(S) | : Candelore et al. | |

It is certified that error appears in the above-identified patent and that said Letters Patent is hereby corrected as shown below:

In Col. 1, beginning at line 65, delete "portions to be encrypted, the content can effectively be encrypted for use under multiple decryption systems without the necessity of encryption of the entire selection"

In Col. 2, after line 8, insert the title -- BRIEF DESCRIPTION OF THE DRAWINGS -- therefor.

In Col. 2, line 55, delete "AN" and insert -- A/V -- therefor.

Signed and Sealed this

Twenty-ninth Day of July, 2008

JON W. DUDAS
*Director of the United States Patent and Trademark Office*